(12) United States Patent
Chen

(10) Patent No.: US 11,682,789 B2
(45) Date of Patent: Jun. 20, 2023

(54) ENVIRONMENTALLY PREFERABLE METHOD OF MAKING SOLID ELECTROLYTE AND INTEGRATION OF METAL ANODES THEREOF

(71) Applicant: Lin Chen, Chicago, IL (US)

(72) Inventor: Lin Chen, Chicago, IL (US)

(73) Assignee: SHENZHEN XWORLD TECHNOLOGY LIMITED, Shenzhen (CN)

( * ) Notice: Subject to any disclaimer, the term of this patent is extended or adjusted under 35 U.S.C. 154(b) by 696 days.

(21) Appl. No.: 16/173,521

(22) Filed: Oct. 29, 2018

(65) Prior Publication Data

US 2020/0136176 A1 Apr. 30, 2020

(51) Int. Cl.
*H01M 10/0562* (2010.01)
*H01M 10/052* (2010.01)
(Continued)

(52) U.S. Cl.
CPC ..... *H01M 10/0562* (2013.01); *H01M 10/052* (2013.01); *C04B 35/486* (2013.01);
(Continued)

(58) Field of Classification Search
CPC ........ C04B 35/62665; C04B 35/62645; C04B 35/626; H01M 2300/0068;
(Continued)

(56) References Cited

U.S. PATENT DOCUMENTS

2002/0107140 A1* 8/2002 Hampden-Smith ...... B01J 23/34
502/185
2003/0049517 A1 3/2003 Hampden-Smith
(Continued)

FOREIGN PATENT DOCUMENTS

KR 101900823 A 6/2017
WO WO-0199215 A1 * 12/2001 ............. B82Y 30/00
(Continued)

OTHER PUBLICATIONS

Djenadic et al., Nebulized spray pyrolysis of Al-doped Li7La3Zr2O12 solid electrolyte for battery applications, Jun. 2, 2014, Elsevier, Solid State Ionics 263 (2014) 49-56 (Year: 2014).*
(Continued)

*Primary Examiner* — Carlos Barcena
(74) *Attorney, Agent, or Firm* — Neal, Gerber & Eisenberg LLP

(57) ABSTRACT

A novel and environmentally preferable method is provided for preparing solid electrolyte particles capable of making dense, flexible, $Li^+$ conducting electrolyte thin films. Methods are also provided for using the solid electrolyte particles and/or thin films in manufacturing safer and more efficient lithium-based batteries. In particular, the method uses inorganic precursors instead of using organic precursors in preparing an aerosol and then convert the aerosol to solid powders to provide the solid electrolyte particles. The solid electrolyte particles prepared have a cubic polymorph and have a desired particle size range, and are capable of making a solid electrolyte film with a thickness less than 50 μm.

19 Claims, 3 Drawing Sheets

(51) Int. Cl.
*C04B 35/626* (2006.01)
*C04B 35/486* (2006.01)

(52) U.S. Cl.
CPC ............. *C04B 35/62665* (2013.01); *H01M 2300/0077* (2013.01)

(58) Field of Classification Search
CPC ....... H01M 2300/077; H01M 10/0562; H01M 10/052; H01M 10/056
USPC ............................................. 429/304
See application file for complete search history.

(56) References Cited

U.S. PATENT DOCUMENTS

| | | | |
|---|---|---|---|
| 2010/0047696 A1 | 2/2010 | Yoshida | |
| 2011/0053001 A1 | 3/2011 | Babic | |
| 2012/0216394 A1* | 8/2012 | Kitaura | H01M 10/052 |
| | | | 29/623.2 |
| 2015/0180001 A1 | 6/2015 | Johnson | |
| 2016/0013513 A1 | 1/2016 | Gaben | |
| 2016/0111751 A1* | 4/2016 | Badding | C04B 35/50 |
| | | | 429/322 |
| 2016/0268629 A1 | 9/2016 | Tanaka | |
| 2017/0062873 A1* | 3/2017 | Iyer | H01M 10/0562 |
| 2017/0179544 A1* | 6/2017 | Lin | H01M 10/4235 |
| 2018/0241083 A1* | 8/2018 | Takami | H01M 10/0569 |
| 2018/0248233 A1 | 8/2018 | Schade | |
| 2018/0375150 A1* | 12/2018 | Yamamoto | G04C 10/00 |
| 2019/0177238 A1* | 6/2019 | Yi | C04B 35/6264 |

FOREIGN PATENT DOCUMENTS

| | | |
|---|---|---|
| WO | 2017172793 A1 | 10/2017 |
| WO | 2018089430 A1 | 5/2018 |

OTHER PUBLICATIONS

Yi, Eongyu, Flame made nanoparticles permit processing of dense, flexible, Li+ conducting ceramic electrolyte thin films of cubic-Li7La3Zr2O12 (c-LLZO), J. Mater. Chem. A, 2016, 4, 12947-12954.

International Search Report and Written Opinion issued in PCT/US18/57975, dated Feb. 22, 2019, 11 pages.

* cited by examiner

ENVIRONMENTALLY PREFERABLE METHOD OF MAKING SOLID ELECTROLYTE AND INTEGRATION OF METAL ANODES THEREOF

TECHNICAL FIELD

This disclosure relates to a novel and environmentally preferable method of preparing solid electrolyte particles capable of making dense, flexible, Li$^+$ conducting electrolyte thin films, and methods of using the solid electrolyte particles and/or thin films in manufacturing safer and more efficient lithium-based batteries.

TECHNICAL BACKGROUND

Because lithium batteries have great electrochemical capacity, high operating potential and superior charge/discharge cycles, demand therefor in the fields of portable information terminals, portable electronic devices, small power storage devices for home use, motorcycles, electric cars, hybrid electric cars, and the like is increasing. Hence, improvements to the safety and performance of lithium battery are required in response to the proliferation of such applications.

Conventional lithium batteries using a liquid electrolyte are problematic because of possible leakage and easy ignition of the electrolyte. Such problems pertaining to safety come to the fore as electric cars are becoming popular.

In order to improve safety, thorough research is thus ongoing these days into all-solid-state batteries using a solid electrolyte composed of a non-combustible inorganic material. All-solid-state batteries, having stability, high energy density, potentially simple manufacturing processes, large/small sizes, and low prices, are receiving attention as a next-generation battery.

SUMMARY

This disclosure relates to a novel and environmentally preferable method of preparing solid electrolyte particles capable of making dense, flexible, Li$^+$ conducting electrolyte thin films, and methods of using the solid electrolyte particles and/or films in manufacturing safer and more efficient lithium-based batteries. Particularly, the new method uses flame-assisted spray pyrolysis to covert inorganic precursors to make desirable cubic Li$_7$La$_3$Zr$_2$O$_{12}$ (c-LLZO) based particles that are capable of making thin c-LLZO based films suitable for solid-state lithium batteries.

In a first aspect, the present disclosure provides a method of preparing solid electrolyte particles. The method may include: preparing a solution of solid electrolyte precursors by dissolving a mixture comprising an inorganic lithium precursor, an inorganic lanthanum precursor, and an inorganic zirconium precursor in an organic solvent; generating an aerosol of said solution; converting the aerosol to solid powders at elevated temperature; and annealing said solid powders to provide the solid electrolyte particles. The solid electrolyte particles have a cubic polymorph and have a particle size range of about 20 nm to 10 μm, and the solid electrolyte particles are capable of making a solid electrolyte film with a thickness between about 5-50 μm.

In a second aspect, the present disclosure provides method of using the solid electrolyte particles to make thin films with a thickness of about 5-50 μm.

In a third aspect, the present disclosure provides method of using the thin films with a thickness of about 5-50 μm to make safer and solid-sate lithium batteries.

DETAILED DESCRIPTION

Figure 1:
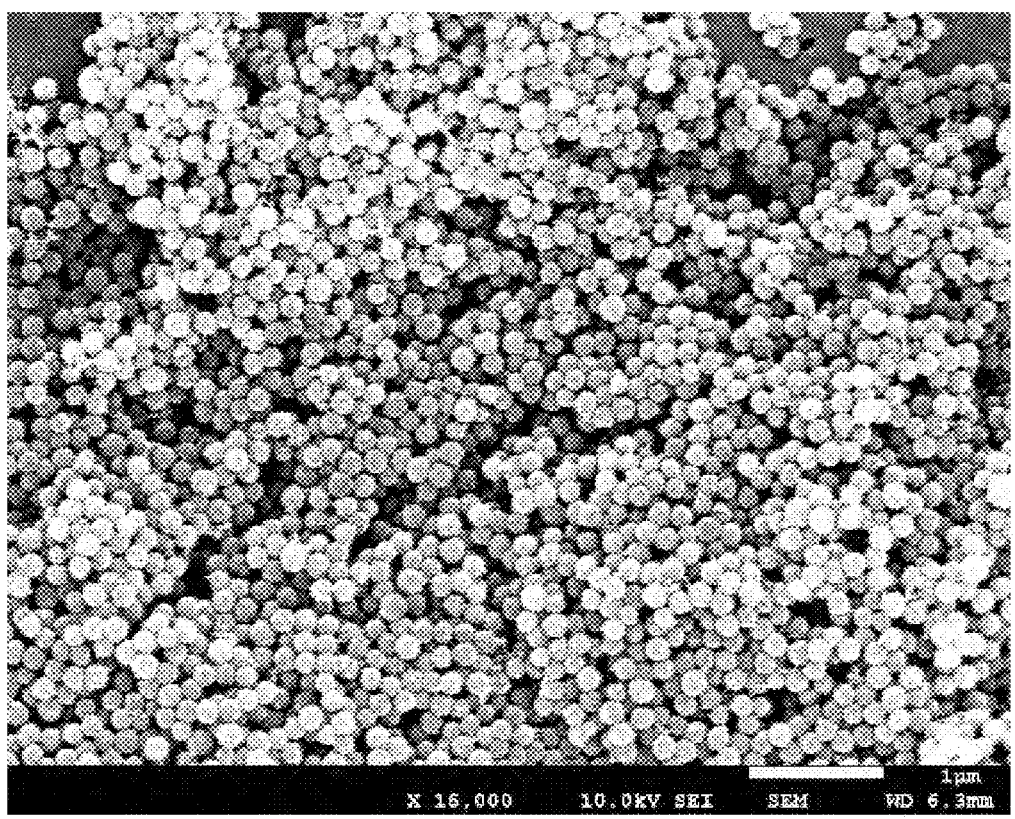
FIG. 1 shows the Field Emission Scanning Electron Microscopy (FESEM) image of LLZO particles of Example 1 with a magnification factor of 16,000.

A solid-state battery is configured to include a cathode, a solid electrolyte layer and an anode, in which the solid electrolyte of the solid electrolyte layer has to possess high ionic conductivity and low electronic conductivity. It can be configured as all-solid-state batteries with no liquid or semi-solid-state batteries with small portion of liquid. Furthermore, for all-solid-state batteries, a solid electrolyte can be contained in the cathode and the anode as electrode layers.

A solid electrolyte that satisfies the requirements of the solid electrolyte layer of the solid-state secondary battery includes a sulfide, an oxide, a solid polymer or the like. In particular, a sulfide-based solid electrolyte is problematic in terms of production of a resistance component through the interfacial reaction with a cathode active material or an anode active material, high moisture absorption properties, and also generation of a hydrogen sulfide (H$_2$S) gas that is poisonous.

Immense attention and effort have been given to cubic Li$_7$La$_3$Zr$_2$O$_{12}$ (c-LLZO) or other metal doped c-LLZO as it exhibits a combination of desirable characteristics such as high ionic conductivities (0.1-1 mS/cm), lithium stability, wide electrochemical operating window (~6 V) and pH stability (7-11.5). In particular, due to higher safety standards required for bulk battery systems, recent interest has grown in incorporating c-LLZO in all-solid-sate lithium batteries (ASLBs) to construct inherently safe cells, concomitantly obviating safety mechanisms related to lithium ion batteries.

There is considerable need today for c-LLZO electrolyte films less than 50 μm thick. Despite the need and interest, most prototype cells use relatively thick LLZO membrane (50-200 μm or even 1 cm) that are produced by LLZO powders (normally with unevenly distributed particle sizes of about ten to several hundred μm) from solid-state chemical reactions along with high temperature sintering. Net ionic conductivities at this thickness are far from optimal and reduce the potential utility in lithium batteries for bulk storage applications.

In order for c-LLZO to be used in actual cells, it must be incorporated in thin film forms preferably less than 50 μm. However, very few dense, thin c-LLZO films with ionic conductivities equivalent to those found in high density, bulk counterparts (over 0.1 mS/cm) have been reported likely due to the energy intensive and rather problematic sintering processes. Normal sintering conditions are 1100-1250° C. for 10-40 hours. Under such harsh conditions, lithium (as Li$_2$O) volatizes rapidly at these temperatures presenting exceptional challenges in producing thin films giving much higher surface/volume ratios leading to faster lithium loss.

Yi et al. disclosed a method of using organic precursors to prepare c-LLZO that is capable of making thinner c-LLZO films. However, it may not economically or environmental preferable in industrial scale up by using organic precursors. See Yi et al., Flame made nanoparticles permit processing of dense, flexible, Li$^+$ conducting ceramic electrolyte thin films of cubic-Li$_7$La$_3$Zr$_2$O$_{12}$ (c-LLZO), J. Mater. Chem. A, 2016, 4, 12947-12954.

Therefore, there is still a need to develop a more economically and environmentally preferable method for preparing c-LLZO particles that are capable of making thin c-LLZO films suitable for solid-sate lithium batteries.

For the purposes of promoting an understanding of the principles of the present disclosure, reference will now be made to the examples illustrated in the drawings, and specific language will be used to describe the same. It will nevertheless be understood that no limitation of the scope of this disclosure is thereby intended.

In the present disclosure the term "about" can allow for a degree of variability in a value or range, for example, within 20%, within 10%, within 5%, or within 1% of a stated value or of a stated limit of a range.

Generally, c-LLZO particles are prepared by solid state reactions. It means that solid state inorganic precursors are reacted under very high temperature, which is usually over 1000° C. Such solid state reaction often needs significantly amount of energy. In addition, the particles obtained do not have good quality due to larger particle sizes and/or not uniform particle shapes as well as incomplete reactions. Such kind of particles are not able to provide high quality and thin films that are required for solid state electrolyte lithium-based batteries.

Yi et al. reported using organic precursors to prepare higher quality c-LLZO particles. See Yi et al., Flame made nanoparticles permit processing of dense, flexible, Li$^+$ conducting ceramic electrolyte thin films of cubic-Li$_7$La$_3$Zr$_2$O$_{12}$ (c-LLZO), J. Mater. Chem. A, 2016, 4, 12947-12954. However, each precursor has to be prepared as an organic compound. It is also expensive and less favorable than more readily available solid precursor such as salt or oxide.

Inorganic salts normally dissolve in water instead of organic solvent. The aqueous precursor may not provide comparable quality c-LLZO particles and may need higher temperature. The present disclosure found some organic solvent can dissolve some inorganic precursors. Such organic solution can go through aerosol and react at elevated temperature to provide good quality c-LLZO or doped c-LLZO particles, which can be converted to suitable thin films for lithium-based batteries. Such method is therefore more economically and environmentally favorable for industrial scale-up.

In the present disclosure the term "substantially" can allow for a degree of variability in a value or range, for example, within 80%, within 85%, within 90%, within 95%, or within 99% of a stated value or of a stated limit of a range.

In the present disclosure the term "aerosol" refers to a suspension of fine solid particles or liquid droplets, in air or another gas or gas mixture. The gas mixture may be a mixture of oxygen, nitrogen, an organic solvent such as methanol or ethanol. In one aspect, the term "aerosol" refers to liquid solution droplets.

In one example, the present disclosure provides a method of preparing solid electrolyte particles, wherein the method comprises:
 a) preparing a solution of solid electrolyte precursors by dissolving a mixture comprising an inorganic lithium precursor, an inorganic lanthanum precursor, and an inorganic zirconium precursor in an organic solvent;
 b) generating an aerosol of said solution;
 c) converting the aerosol to solid powders at elevated temperature; and
 d) annealing said solid powders to provide the solid electrolyte particles, wherein the solid electrolyte particles have a cubic polymorph and have a particle size range of 20 nm to 10 μm, and the solid electrolyte particles are capable of making a solid electrolyte film with a thickness between about 5-50 μm.

In one example, the present disclosure provides a method of preparing solid electrolyte particles, wherein the method comprises:
 a) preparing a solution of solid electrolyte precursors by dissolving a mixture comprising an inorganic lithium precursor, an inorganic lanthanum precursor, and an inorganic zirconium precursor in an organic solvent, wherein said mixture may further comprise an optional inorganic yttrium precursor, an optional inorganic niobium precursor, an inorganic germanium precursor, or an optional inorganic aluminum precursor;
 b) generating an aerosol of said solution;
 c) converting the aerosol to solid powders at elevated temperature; and
 d) annealing said solid powders to provide the solid electrolyte particles, wherein the solid electrolyte particles have a cubic polymorph and have a particle size range of 20 nm to 10 μm, and the solid electrolyte particles are capable of making a solid electrolyte film with a thickness between about 5-50 μm.

In any example of the present disclosure, the prepared solution of inorganic precursors is a substantially homogeneous solution in organic solvent or organic solvent mixture.

In any example of the present disclosure, an organic solvent used to prepare inorganic precursor solution may be any polar organic solvent such as an alcohol, carboxylic acid, ester, ether, or any combination thereof. In one aspect, the solvent may be a $C_1$-$C_6$ straight, branched or cyclic alcohol, or any combination thereof. The preferred alcohol is methanol or ethanol. In one aspect, the solvent may be a $C_2$-$C_6$ straight, branched or cyclic carboxylic acid, or any combination thereof. The preferred carboxylic acid is acetic acid.

In any example of the present disclosure, an inorganic lithium precursor may be any lithium salt, which may be but is not limited to a nitrate, sulfate, chloride, fluoride, bromide, hydroxide, carbonate, bicarbonate, phosphate, dihydrogen phosphate, hydrogen phosphate, acetate, oxalate, any hydrate thereof, or any combination thereof. A preferred lithium precursor is lithium nitrate or a hydrate thereof.

In any example of the present disclosure, an inorganic lanthanum precursor may be any lanthanum salt, which may be but is not limited to a nitrate, sulfate, chloride, fluoride, bromide, hydroxide, carbonate, bicarbonate, phosphate, dihydrogen phosphate, hydrogen phosphate, acetate, oxalate, any hydrate thereof, or any combination thereof. A preferred lanthanum precursor is lanthanum nitrate or a hydrate thereof.

In any example of the present disclosure, an inorganic zirconium precursor may be any zirconium salt, which may be but is not limited to a nitrate, sulfate, chloride, fluoride, bromide, hydroxide, carbonate, bicarbonate, phosphate, dihydrogen phosphate, hydrogen phosphate, acetate, oxalate, any hydrate thereof, or any combination thereof. A preferred zirconium precursor is zirconium nitrate or a hydrate thereof.

In any example of the present disclosure, an optional inorganic yttrium precursor may be any yttrium salt, which may be but is not limited to a nitrate, sulfate, chloride, fluoride, bromide, hydroxide, carbonate, bicarbonate, phosphate, dihydrogen phosphate, hydrogen phosphate, acetate, oxalate, any hydrate thereof, or any combination thereof. A preferred yttrium precursor is yttrium nitrate or a hydrate thereof.

In any example of the present disclosure, an optional inorganic niobium precursor may be any niobium salt, which may be but is not limited to a nitrate, sulfate, chloride, fluoride, bromide, hydroxide, carbonate, bicarbonate, phosphate, dihydrogen phosphate, hydrogen phosphate, acetate, oxalate, any hydrate thereof, or any combination thereof. A preferred niobium precursor is niobium nitrate or oxalate, or a hydrate thereof. In one aspect, the inorganic niobium precursor is ammonium niobate (V) oxalate or a hydrate thereof.

In any example of the present disclosure, an optional inorganic germanium precursor may be any germanium salt, which may be but is not limited to a nitrate, sulfate, chloride, fluoride, bromide, hydroxide, carbonate, bicarbonate, phosphate, dihydrogen phosphate, hydrogen phosphate, acetate, oxalate, any hydrate thereof, or any combination thereof. A preferred germanium precursor is germanium nitrate or a hydrate thereof.

In any example of the present disclosure, an optional inorganic aluminum precursor may be any aluminum salt, which may be but is not limited to a nitrate, sulfate, chloride, fluoride, bromide, hydroxide, carbonate, bicarbonate, phosphate, dihydrogen phosphate, hydrogen phosphate, acetate, oxalate, any hydrate thereof, or any combination thereof. A preferred aluminum precursor is aluminum nitrate or a hydrate thereof. In one aspect, the aluminum precursor is added to stabilize the cubic polymorph of c-LLZO.

In one aspect, an optional second inorganic lithium material may be added to an inorganic precursor mixture to make an inorganic precursor solution to compensate the possible loss of lithium during the conversion of the aerosol to said solid powders at elevated temperature. The optional second inorganic lithium material may be the same or different from the lithium precursor. The optional second inorganic lithium material may be any lithium oxide or lithium salt. The lithium salt may be but is not limited to a nitrate, sulfate, chloride, fluoride, bromide, hydroxide, carbonate, bicarbonate, phosphate, dihydrogen phosphate, hydrogen phosphate, acetate, oxalate, any hydrate thereof, or any combination thereof. In one aspect, about 5-50 wt %, 5-40%, 5-30%, 5-20%, 10-50%, 10-40%, 10-30%, or 10-20% excess of second inorganic lithium material may be added to compensate for lithium loss during the conversion of aerosol to solid powders at elevated temperature and/or during the annealing process. A preferred optional second inorganic lithium material is lithium carbonate, lithium oxide, a hydrate thereof, or any combination thereof.

In one example, the present disclosure provides a method of preparing solid electrolyte particles. The method may include:
 a) preparing a solution of solid electrolyte precursors by dissolving a mixture comprising an inorganic lithium precursor, an inorganic lanthanum precursor, and an inorganic zirconium precursor in an organic solvent, wherein said mixture may further comprise an optional inorganic yttrium precursor, an optional inorganic niobium precursor, an inorganic germanium precursor, or an optional inorganic aluminum precursor;
 b) generating an aerosol of said solution;
 c) converting the aerosol to solid powders at elevated temperature; and
 d) annealing said solid powders to provide the solid electrolyte particles.

The solid electrolyte particles have a cubic polymorph and have a particle size range of 20 nm to 10 μm, and the solid electrolyte particles are capable of making a solid electrolyte film with a thickness between about 5-50 μm.

The inorganic lithium precursor is lithium nitrate, hydrate thereof, or any combination thereof the inorganic lanthanum precursor is lanthanum nitrate, hydrate thereof, or any combination thereof; the inorganic zirconium precursor is zirconium nitrate, hydrate thereof, or any combination thereof; the optional inorganic yttrium precursor is yttrium nitrate, hydrate thereof, or any combination thereof, optional inorganic niobium precursor is ammonium niobate (V) oxalate or a hydrate thereof the optional inorganic germanium precursor is germanium nitrate, hydrate thereof, or any combination thereof, and the optional inorganic aluminum precursor is aluminum nitrate, hydrate thereof, or any combination thereof.

In any example, the ratio of inorganic precursors to make the solid electrolyte particles is adjusted to ensure the solid electrolyte particles be represented by formula $Li_7La_3Zr_2O_{12}$, $Li_{7-3x}Al_xLa_3Zr_2O_{12}$, $Li_{7-3x}Y_xLa_3Zr_2O_{12}$, $Li_{7-3x}Nb_xLa_3Zr_2O_{12}$, $Li_{7-3x}Ga_xLa_3Zr_2O_{12}$, or any combination thereof, wherein $0 \leq x \leq 2$. In one aspect, the total lithium molar ratio of the required inorganic lithium precursor:the total lanthanum molar ratio of the inorganic lanthanum precursor:the total zirconium molar ratio of the inorganic zirconium precursor is about 5-9:0.5-3.5:0.5-2.5. In one aspect, the total lithium molar ratio of inorganic lithium precursor:the total lanthanum molar ratio of the inorganic lanthanum precursor:the total zirconium molar ratio of inorganic zirconium precursor is about 7:3:2. In one aspect, when an optional inorganic aluminum precursor is added, the molar ratio of the optional inorganic aluminum precursor to the inorganic lanthanum precursor is about 1:20, 1:15, 1:10, or 1:5. In one preferred aspect, the molar ratio of the optional inorganic aluminum precursor to the inorganic lanthanum precursor is about 1:10. In one aspect, when an optional inorganic yttrium precursor is added, the molar ratio of the optional inorganic yttrium precursor to the inorganic lanthanum precursor is about 1:200, 1:175, 1:150, 1:125, 1:100, 1:90, 1:80, 1:70, 1:60, or 1:50. In one preferred aspect, the molar ratio of the optional inorganic yttrium precursor to the inorganic lanthanum precursor is about 1:100. In one aspect, when an optional inorganic niobium precursor is added, the molar ratio of the optional inorganic niobium precursor to the inorganic lanthanum precursor is about 1:20, 1:15, 1:10, or 1:5. In one preferred aspect, the molar ratio of the optional inorganic niobium precursor to the inorganic lanthanum precursor is about 1:10.

In one example, the aerosol of the inorganic precursor solution may be generated by any aerosol generator such as an atomizer. Any suitable gas or gas mixture can be used as atomizing gas. In one aspect, the aerosol may be generated by an atomizer with methanol-saturated nitrogen as atomizing gas. In one aspect, the flow rate of $H_2$ and the atomizing gas are kept at a substantially constant rate, respectively. The flow rate of $H_2$ and the atomizing gas may be same or different.

In one example, the step of converting an aerosol to solid powders at elevated temperature may be achieved by method such as but is not limited to flame-assisted spray pyrolysis, ultrasonic spray pyrolysis, sol-gel process, electrospinning, or any combination thereof. In one aspect, the method is flame-assisted spray pyrolysis.

In one example, the methods of making c-LLZO solid electrolyte particles provides improved particle size range and/or particle shape. The method of the present disclosure can provide average smaller particle sizes such as nanometer or micrometer diameter particles. The method of the present disclosure may avoid using the high energy ball milling process, which can add significant cost. In one aspect, the average particle size range of the solid electrolyte particles is about 20 nm to 10 μm, 20 nm to 5 μm, 20 nm to 4 μm, 20 nm to 3 μm, 20 nm to 2 μm, 20 nm to 1 μm, 20 nm to 0.9 μm, 20 nm to 0.8 μm, 20 nm to 0.7 μm, 20 nm to 0.6 μm, 20 nm to 0.5 μm, 20 nm to 0.4 μm, 20 nm to 0.3 μm, 20 nm to 0.2 μm, 20 nm to 0.1 μm, 50 nm to 10 μm, 50 nm to 5 μm, 50 nm to 4 μm, 50 nm to 3 μm, 50 nm to 2 μm, 50 nm to 1 μm, 50 nm to 0.9 μm, 50 nm to 0.8 μm, 50 nm to 0.7 μm, 50 nm to 0.6 μm, 50 nm to 0.5 μm, 50 nm to 0.4 μm, 50 nm to 0.3 μm, 50 nm to 0.2 μm, 50 nm to 0.1 μm, 100 nm to 10 μm, 100 nm to 5 μm, 100 nm to 4 μm, 100 nm to 3 μm, 100 nm to 2 μm, 100 nm to 1 μm, 100 nm to 0.9 μm, 100 nm to 0.8 μm, 100 nm to 0.7 μm, 100 nm to 0.6 μm, 100 nm to 0.5 μm, 100 nm to 0.4 μm, 100 nm to 0.3 μm, 100 nm to 0.2 μm, 500 nm to 10 μm, 500 nm to 5 μm, 500 nm to 4 μm, 500 nm to 3 μm, 500 nm to 2 μm, 500 nm to 1 μm, or any combination thereof.

In one example, the temperature of annealing solid powders obtained from the converting of aerosol is about 500-1200° C., 600-1200° C., 700-1200° C., 500-1000° C., 600-1000° C., 700-1000° C., 500-800° C., 600-800° C., or 700-800° C. In one aspect, the annealing temperature is about 700° C. In one aspect, the annealing time is about 0.5-6 h, 0.5-5 h, 0.5-4 h, 0.5-3 h, 01-6 h, 1-5 h, 1-4h, or 1-3 h.

The present disclosure also provides method to make c-LLZO based solid-state electrolyte film/membrane. Solid electrolyte particles of the present disclosure may be combined with additives/solvents such as gelatin, butadiene or polybutadiene, acrylonitrile or polyacrylonitrile, polyvinyl butyral, benzyl butyl phthalate, acetone, and/or ethanol to form a suspension, which can be casted with a suitable coater such as wire wound rod coater to fabricate c-LLZO based solid-state electrolyte film/membrane with a thickness of about less than 50 μm, less than 45 μm, less than 40 μm, less than 35 μm, less than 30 μm, less than 25 μm, or less than 20 μm. In one aspect, the thickness of the film/membrane is about 5-50 μm, 5-45 μm, 5-40 μm, 5-35 μm, 5-30 μm, 5-25 μm, or 5-20 μm.

In one example, the c-LLZO based solid-state electrolyte film/membrane of the present disclosure may be paired with lithium metal in lithium battery manufacturing. By using atomic layer deposition method, an ultra-thin layer of metal oxide such as but is not limited to $La_2O_3$, CuO, $ZrO_2$, $HfO_2$, or any combination thereof may be deposited on c-LLZO based solid-state electrolyte film/membrane to form a metal oxide layer, and followed by physically and chemically integrating lithium metal onto the metal oxide layer. The thickness of the metal oxide layer is about 0.5-20 nm, 0.5-15 nm, 0.5-10 nm, 0.5-5 nm, 1-20 nm, 1-15 nm, 1-10 nm, or 1-5 nm. Alternatively, the c-LLZO based solid-state electrolyte film/membrane may be treated with argon, nitrogen, oxygen, or other suitable gas plasma for a short period of time such as about 10-60 seconds, 20-45 second, or 25-35 seconds. And then integrate lithium metal on top of the c-LLZO based solid-state electrolyte film/membrane without metal oxide layer. In either situation, the thickness of the lithium metal can be controlled within 5-50 μm with a film adaptor. This approach can provide the combination of an anode and the solid-state electrolyte of the present disclosure.

Example 1: c-LLZO PARTICLES

Figure 2:
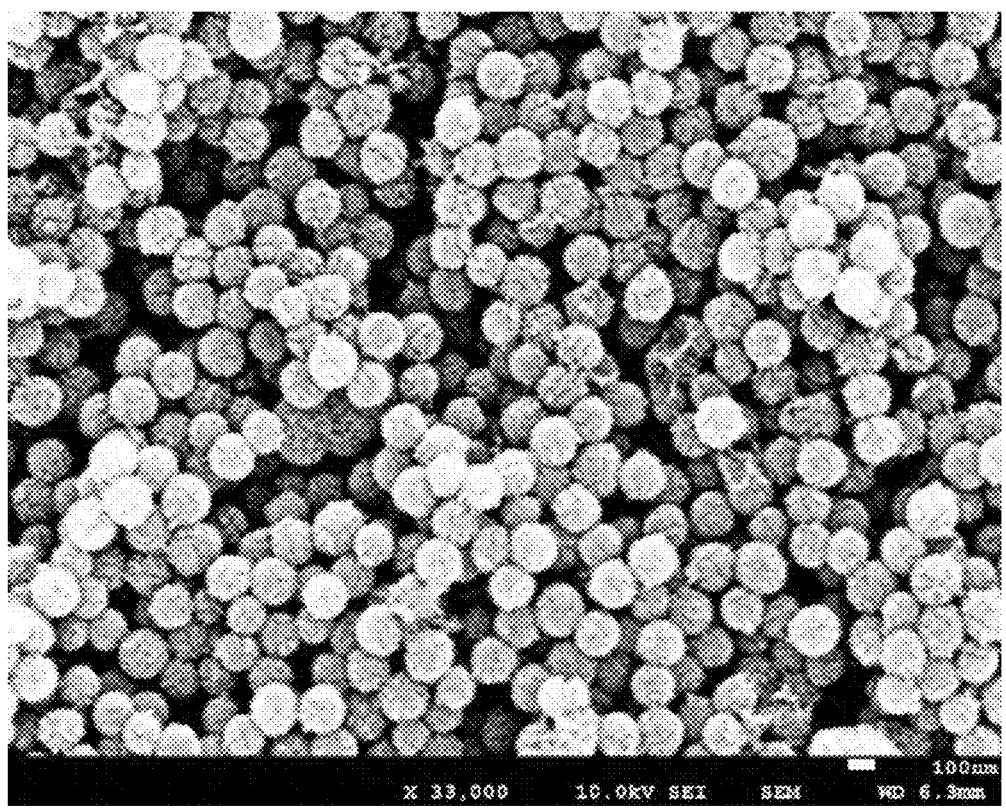
FIG. 2 shows the FESEM image of LLZO particles of Example 1 with a magnification factor of 33,000.
Figure 3:
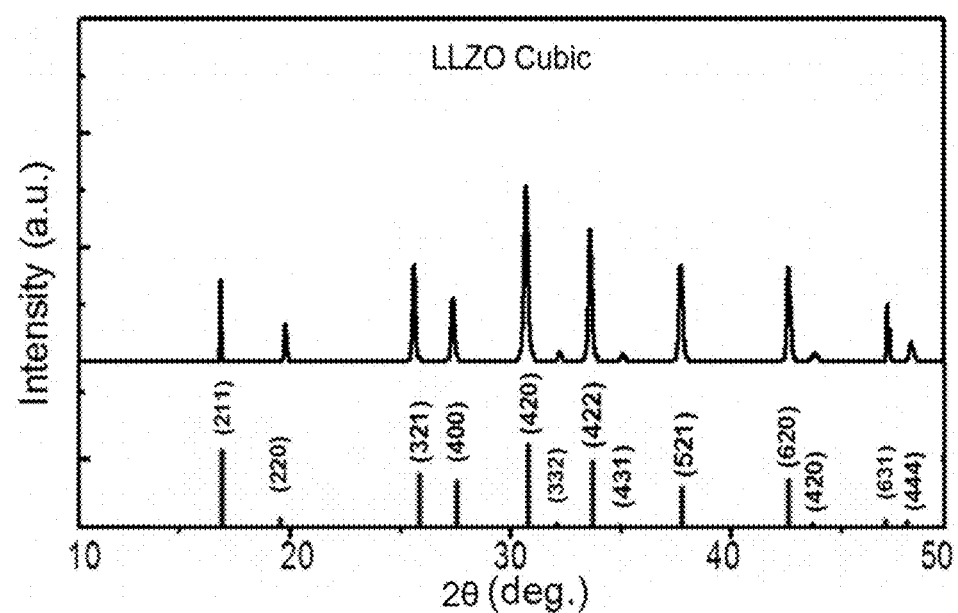
FIG. 3 shows the X-Ray Diffraction (XRD) of LLZO particles of Example 1.

A precursor solution was prepared by dissolving stoichiometric quantities (about 7:3:2 molar ratio) of $LiNO_3$, $La(NO_3)_2$ and $Zr(NO_3)_4.5H_2O$ in methanol. $Al(NO_3)_3$ (the molar ratio of Al:La is about 0.09:1) was added to stabilize the cubic polymorph and about 10 wt % excess $Li_2CO_3$ was added to compensate for Li loss during calcination. $Y(NO_3)_3$ (the molar ratio of Y:La is 0.01:1) or Ammonium niobate(V) oxalate hydrate (the molar ratio of Nb:La is 0.1:1). The concentration of $LiNO_3$ was kept about 0.5 mol/L. A precursor aerosol was generated with the precursor solution in an atomizer with methanol-saturated $N_2$ atomizing gas. The atomizing gas was saturated with methanol vapor prior to entering the atomizer to prevent evaporation of solvent methanol, thus maintaining a constant precursor concentration. The flow rates of $H_2$ and the atomizing gas $N_2$ were kept at about 0.5 L/min and 2.5 L/min, respectively. To improve the grain sizes and remove impurity phases, the flame-synthesized powder was annealed at 700° C. for 3 h to provide Example 1. FIG. 1 and FIG. 2 show the Field Emission Scanning Electron Microscopy (FESEM) images of the obtained LLZO particles of Example 1 with magnification factor of 16,000 and 33,000, respectively. It can be found in the images that the particles size of Example 1 is in the range of about 50-200 nm. The FESEM images clearly show that the LLZO particles of Example 1 are substantially spherical and uniform. Such substantially spherical and uniform shaped particles make it possible to prepare thin LLZO films with a film thickness below 50 μm. FIG. 3 shows the X-Ray Diffraction (XRD) of the obtained LLZO particles of Example 1. For the sample preparation of the Field Emission Scanning Electron Microscope (FESEM) characterization, LLZO powders were attached onto a carbon tape followed by gold coating to increase the conductivity. The XRD data of Example 1 were collected in the 2-theta range from 10-50 degree using Bruker X2 with CuKα radiation.

Example 2: c-LLZO FILM

As-produced powders were first dispersed in EtOH (200 proof) with about 2 wt % polyacrylic acid as dispersant, and treated with an ultrasonic horn at 100 W for 15 min. The suspension was let settle for 4 hours to allow larger particles to settle. Supernatant was decanted and the recovered powder dried. Collected powder, polyvinyl butyral, benzyl butyl phthalate, acetone, and ethanol were ball-milled with spherical $ZrO_2$ beads for 12 h to homogenize the suspension. Suspensions were cast using a wire wound rod coater. 10-35 μm film thicknesses were controlled by adjusting the gap between the rod and the substrate. The films were manually peeled off the Mylar substrate, and cut to selected sizes. The films were uniaxially pressed in between stainless steel dies at 80-100° C. with a pressure of 50-70 MPa for 5-10 minutes using a heated bench top press to improve packing density. The final obtained film has a thickness of 22 μm. The method of preparing the film is similar to the method of Yi et al., Flame made nanoparticles permit processing of dense, flexible, Li+ conducting ceramic electrolyte thin films of cubic-$Li_7La_3Zr_2O_{12}$ (c-LLZO), J. Mater. Chem. A, 2016,4,12947-12954.

We claim:

1. A method of preparing solid electrolyte particles, wherein the method comprises:
   a) Preparing an organic solution of solid electrolyte precursors by dissolving a mixture comprising an inorganic lithium precursor, an inorganic lanthanum precursor, and an inorganic zirconium precursor in an organic solvent;
   b) generating an aerosol of said organic solution;
   c) converting the aerosol to solid powders at an elevated temperature; and
   d) annealing said solid powders to provide the solid electrolyte particles, wherein the solid electrolyte particles have a cubic polymorph and have a particle size range of 20 nm to 10 µm, and the solid electrolyte particles are capable of making a solid electrolyte film with a thickness between 5-50 µm.

2. The method of claim 1, wherein the mixture further comprises an optional inorganic yttrium precursor, an optional inorganic niobium precursor, an optional inorganic germanium precursor, an optional inorganic aluminum precursor, or any combination thereof.

3. The method of claim 2, wherein the ratio of inorganic precursors to make the solid electrolyte particles is adjusted to ensure the solid electrolyte particles be represented by formula $Li_7La_3Zr_2O_{12}$, $Li_{z-3x}Al_xLa_3Zr_2O_{12}$, $Li_{z-3x}Y_xLa_3Zr_2O_{12}$, $Li_{z-3x}Nb_xLa_3Zr_2O_{12}$, $Li_{7-3x}Ga_xLa_3Zr_2O_{12}$, or any combination thereof, wherein $0 \leq x \leq 2$.

4. The method of claim 2, wherein the inorganic lithium precursor is lithium nitrate, hydrate thereof, or any combination thereof; the inorganic lanthanum precursor is lanthanum nitrate, hydrate thereof, or any combination thereof; the inorganic zirconium precursor is zirconium nitrate, hydrate thereof, or any combination thereof; the optional inorganic yttrium precursor is yttrium nitrate, hydrate thereof, or any combination thereof; the optional inorganic niobium precursor is niobium nitrate or oxalate or a hydrate thereof; the optional inorganic germanium precursor is germanium nitrate, hydrate thereof, or any combination thereof, and the optional inorganic aluminum precursor is aluminum nitrate, hydrate thereof, or any combination thereof.

5. The method of claim 1, wherein the solution is a substantially at least 80% homogeneous solution in the organic solvent.

6. The method of claim 1, wherein the mixture further comprises an inorganic lithium material to compensate the possible loss of lithium during the conversion of the aerosol to said solid powders at the elevated temperature, wherein the inorganic lithium material may be the same as or different from the inorganic lithium precursor.

7. The method of claim 1, wherein the organic solvent comprises a polar organic solvent.

8. The method of claim 1, wherein the organic solvent comprises an alcohol, carboxylic acid, ester, ether, or any combination thereof.

9. The method of claim 1, wherein the organic solvent comprises methanol or acetic acid, or any combination thereof.

10. The method of claim 6, wherein each inorganic precursor or lithium material is a nitrate, sulfate, chloride, fluoride, bromide, hydroxide, phosphate, dihydrogen phosphate, hydrogen phosphate, any hydrate thereof, or any combination thereof.

11. The method of claim 1, wherein the solid electrolyte particles have a particle size range of 100 nm to 3000 nm.

12. The method of claim 1, wherein the solid electrolyte particles are further converted to solid electrolyte film with a thickness of 5-20 µm.

13. The method of claim 1, wherein the step of converting the aerosol to solid powders at the elevated temperature to said electrolyte material is achieved by flame-assisted spray pyrolysis, ultrasonic spray pyrolysis, sol-gel process, electrospinning, or any combination thereof.

14. The method of claim 1, wherein the solid electrolyte particles are combined with an additive comprising gelatin, butadiene or polybutadiene, acrylonitrile or polyacrylonitrile to provide the solid electrolyte film with more flexibility.

15. The method of claim 1, wherein the step of annealing said solid powders is at a temperature of 500-800° C.

16. The method of claim 1, wherein the step of annealing said solid powders is at a temperature of about 700° C.

17. The method of claim 1, wherein the aerosol is generated with nitrogen.

18. The method of claim 1, wherein the organic solvent is methanol, and the aerosol is generated with methanol-saturated nitrogen.

19. The method of claim 1, wherein the step of converting the aerosol to solid powders at the elevated temperature to said electrolyte material is achieved by flame-assisted spray pyrolysis.

* * * * *